(12) United States Patent
Sorensen et al.

(10) Patent No.: US 7,920,034 B1
(45) Date of Patent: Apr. 5, 2011

(54) COMPACT WAVEGUIDE LOAD

(75) Inventors: Rory Kim Sorensen, Salt Lake City, UT (US); Neil Kenneth Harker, South Jordan, UT (US); Steven Douglas Wollschleger, Salt Lake City, UT (US); Richard Gerald Edwards, Grantsville, UT (US)

(73) Assignee: L-3 Communications Corp., New York, NY (US)

( * ) Notice: Subject to any disclaimer, the term of this patent is extended or adjusted under 35 U.S.C. 154(b) by 0 days.

(21) Appl. No.: 12/964,414

(22) Filed: Dec. 9, 2010

Related U.S. Application Data (62) Division of application No. 12/058,433, filed on Mar. 28, 2008, now Pat. No. 7,868,714.

(51) Int. Cl.
*H01P 1/26* (2006.01)
(52) U.S. Cl. .................................. 333/22 R; 333/81 B
(58) Field of Classification Search ............... 333/22 R, 333/81 B; 29/600, 601
See application file for complete search history.

(56) References Cited

U.S. PATENT DOCUMENTS

| | | | |
|---|---|---|---|
| 2,594,874 A | 4/1952 | Cohn et al. | |
| 3,001,152 A | 9/1961 | Winkler | |
| 3,036,280 A | 5/1962 | Woodcock | |
| 3,904,993 A | 9/1975 | James | |
| 3,914,714 A | 10/1975 | Johnson | |
| 4,516,088 A | 5/1985 | Johnson et al. | |
| 5,004,990 A | 4/1991 | Bergero et al. | |
| 5,742,211 A | 4/1998 | Lauf et al. | |
| 6,970,139 B1 | 11/2005 | Chew et al. | |
| 2004/0119552 A1 | 6/2004 | Wray | |
| 2005/0017815 A1 | 1/2005 | Asao et al. | |

OTHER PUBLICATIONS

Jack T. Gear, "Microwave Absorbers Manage Military Electronics RF Interference," RDF Design, Aug. 2004.
A.R. Kerr et al., "ALMA Memo #494, MF-112 and MF-116: Compact Waveguide Loads and FTS Measurements at Room Temperature and 5 K" May 14, 2004.
M.A.K. Hamid et al., "A Dielectric-Loaded Circular Waveguide Antenna." IEEE Transactions on Antennas and Propagation, Jan. 1972.
U.S. Appl. No. 12/058,433, filed Mar. 28, 2008, Sorensen et al.

*Primary Examiner* — Stephen E Jones
(74) *Attorney, Agent, or Firm* — Kirton & McConkie; William T. Ralston (57) ABSTRACT

A compact integrated waveguide load has a load section disposed within an interior region of the waveguide proximate to a closed end of the waveguide. The load section has a tubiform shape, with an exterior surface congruent with an interior surface of the waveguide and an interior surface defining a circumferential step within the waveguide. A method of making a compact integrated waveguide load includes providing a waveguide and placing electromagnetic wave absorbing materially circumferentially around the interior surface to create an inward step.

4 Claims, 6 Drawing Sheets

FIG. 10

COMPACT WAVEGUIDE LOAD

This application is a divisional of U.S. patent application Ser. No. 12/058,433 (currently pending) filed on Mar. 28, 2008, and claims the benefit thereof. The foregoing application is also herein incorporated by reference.

FIELD OF THE INVENTION

The present application relates to waveguide loads for installation into a waveguide.

BACKGROUND

In radio frequency applications, waveguides are often used for guiding electromagnetic energy from one place to another. Waveguides are also sometimes used as radiating or receiving elements, for example as a horn antenna.

Often, there is a desire to include an electromagnetic wave absorbing load within a waveguide. For example, a load may be used as a termination. A termination can absorb reflected power from a component (e.g., an antenna, circulator, isolator, or the like) to help prevent the reflected power from disrupting system operation.

Generally speaking, a load comprises a lossy material disposed within the waveguide. The lossy material converts incident electromagnetic energy into heat. Lossy materials can include materials with dielectric (E-field) loss, magnetic (H-field) loss, or both.

Because the incident electromagnetic energy is converted into heat, power dissipation within the load can present problems. Typically, the loss material is a relatively poor conductor of heat, thus high power levels or long irradiation times can cause the load to heat to unacceptable temperatures. Accordingly, some loads use complex water cooling arrangements to manage power dissipation and increase power levels which can be accommodated. Water cooling adds cost, complexity, and weight, and is undesirable in some applications.

Generally, it is desirable for a load placed into a waveguide to provide a good impedance match to the waveguide to minimize energy reflected back from the load and provide good power transfer into the load. Reflected energy can, for example, cause damage to electronic components or result in degradation in the performance of the radio frequency system.

Conventionally, to provide a good impedance match has been achieved by using smoothly tapered geometries for the load. For example, known loads are in the form of a pyramid or inverted pyramid shape. The pyramid is positioned within the waveguide, with the point end of the pyramid facing toward the source of electromagnetic energy. Unfortunately, typical loads are relatively large, extending several wavelengths along the waveguide.

SUMMARY OF THE INVENTION

It has been recognized that it would be advantageous to develop a compact waveguide load.

In some embodiments of the invention, a compact waveguide integrated load includes a longitudinal waveguide having a closed end and an open end. A load section is disposed within the interior region of the waveguide proximate to the closed end. The load section extends over a length of the waveguide and protrudes inward from the interior walls of the waveguide, defining a step within the waveguide. The load is formed from electromagnetic wave absorbing material.

In some embodiments of the invention, a compact waveguide integrated load has a tubiform body having a length and a bore. The body is formed from electromagnetic wave absorbing material. The exterior surface of the body has a shape substantially congruent with the interior surface of the waveguide. The interior bore and length are sized to provide an impedance match to the waveguide over a predefined frequency range.

In some embodiments of the invention, a method of making a compact waveguide integrated load includes providing a waveguide and placing electromagnetic wave absorbing material circumferentially around an interior surface of the waveguide to create an inward step. The wave absorbing material extends over a length of the waveguide. The step size and length are sized to provide an impedance match to the waveguide over a predefined frequency range.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

DETAILED DESCRIPTION

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Figure 1:
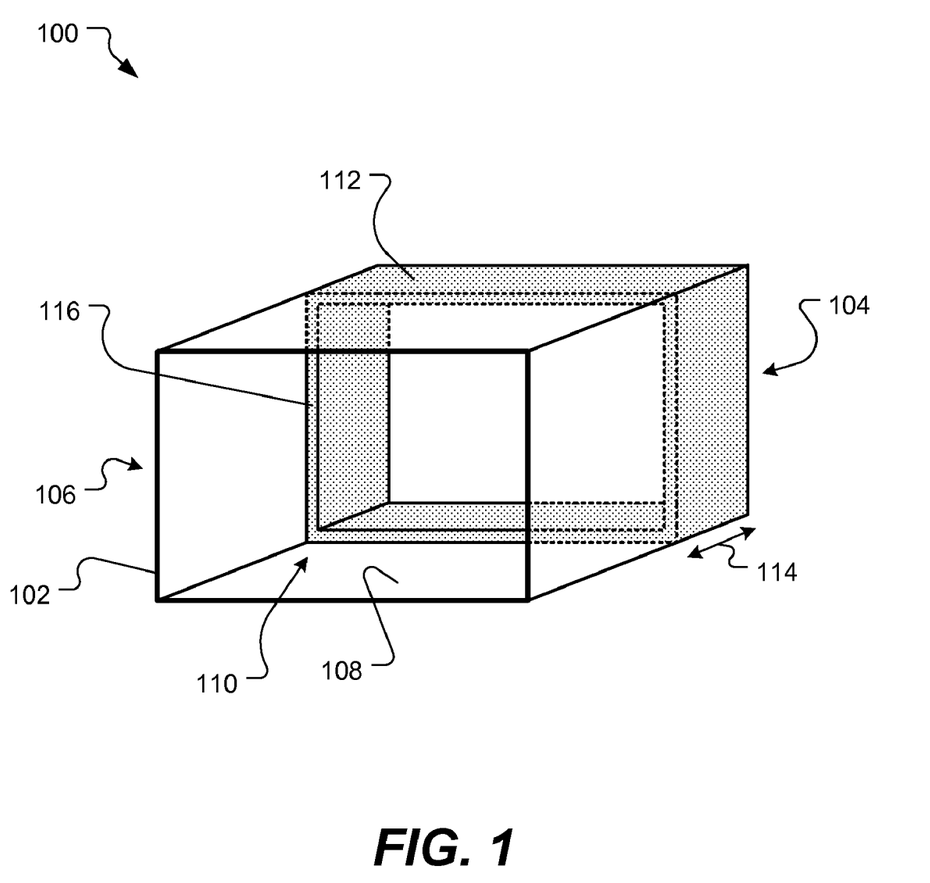
FIG. 1 is a perspective illustration of a compact waveguide integrated load in accordance with some embodiments of the invention.
Figure 2:
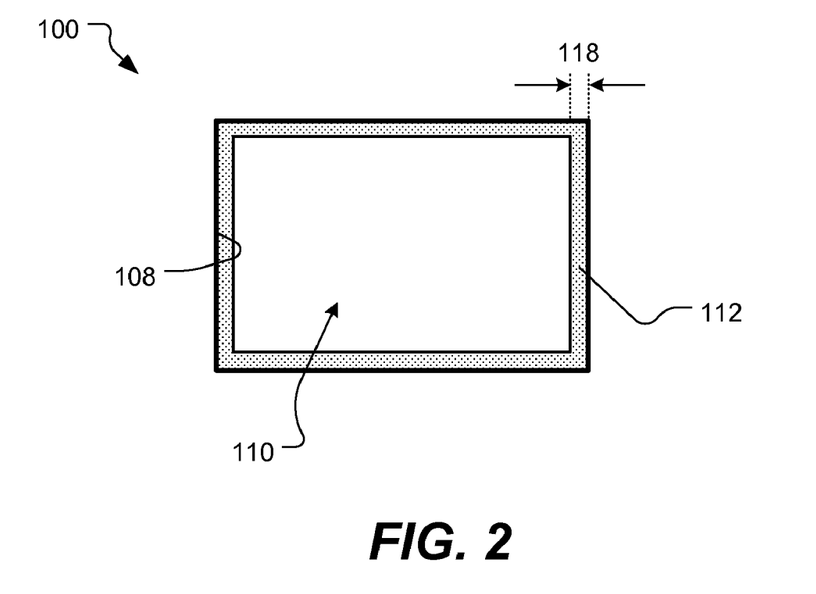
FIG. 2 is an end view of the compact waveguide integrated load of FIG. 1 looking into the open end of the waveguide.
Figure 3:
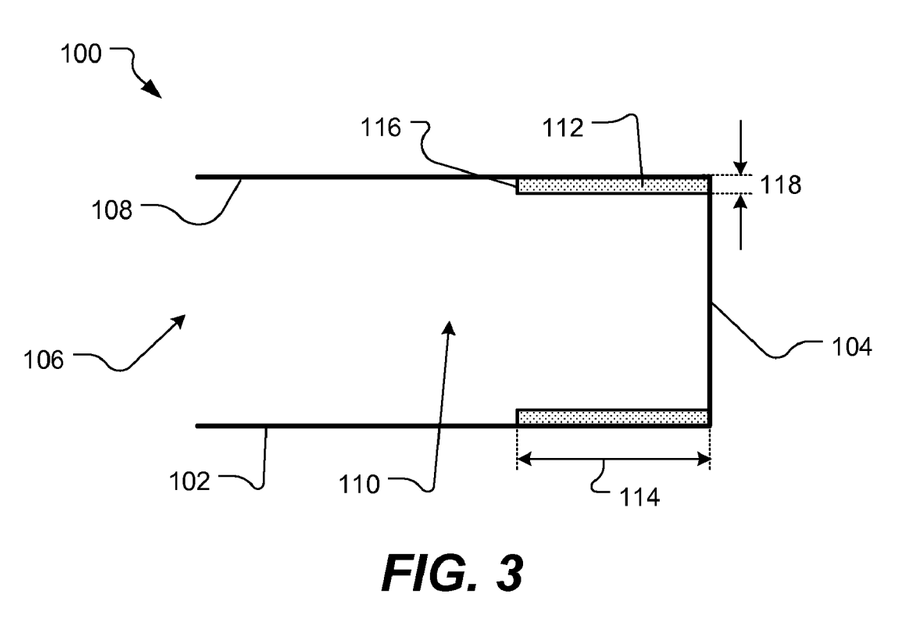
FIG. 3 is a cross-sectional illustration of the compact waveguide integrated load of FIG. 1 taken on a vertical plane oriented parallel with the longitudinal length of the waveguide.

FIGS. 1-3 illustrate a compact waveguide integrated load in accordance with some embodiments of the invention. The compact waveguide integrated load 100 is constructed in a longitudinally extending waveguide 102, for example a rectangular waveguide as shown. The waveguide includes a closed end 104 and an open end 106. Although shown here in the form of a rectangular waveguide, other waveguide shapes can also be used, including for example, circular, elliptical, square, ridged, etc. The waveguide is constructed from material which includes an electrically conductive interior surface 108. Electromagnetic energy propagates within the interior region 110 of the waveguide.

A compact waveguide load 112 is disposed within the interior region 110 adjacent to the closed end 104 of the waveguide 102. The load is formed from electromagnetic-absorbing material. The load extends over a portion of the waveguide having a length 114. The load can be butted against the closed end, although this is not essential. The load has a tubiform body, extending outward from the interior surface 108 into the interior region, and covers the walls on all sides of the waveguide over the length. As shown here, the load has a substantially constant thickness 118, although this is not essential. The thickness may not be exactly constant due to manufacturing tolerances, material imperfections, and the like. The shape of the load creates a bump or step 116 within the waveguide which extends circumferentially around the full interior surface of the waveguide.

Normally, a step within a waveguide causes reflection of electromagnetic energy propagating in the waveguide, resulting in a mismatch. However, by selecting the thickness and length dimension appropriately, it is possible to obtain a good impedance match over a predefined frequency range for a single mode wave propagating within the waveguide. For example, for a custom-size waveguide of 0.485 inch×0.233 inch cross section, a return loss of 20 dB or better was obtained over the Ku-band frequency range of 14 to 16 GHz using a length of 0.230 inch and a thickness of 0.020 inch when the load is constructed from Eccosorb® MF-124 or Eccosorb® CRS-124 absorbing material. Of course, various other electromagnetic wave absorbing materials having differing properties can be used as well, and the length and thickness to provide a good match is a function of the material properties, waveguide size, and frequency range of interest.

Without wishing to be bound by any particular theory, it is believed that matching is obtained as follows. As the electromagnetic wave propagating within the waveguide 102 reaches the step 116, a portion of the energy is reflected from the step back toward the source. The bulk of the electromagnetic wave energy enters the length 114 where the load 112 is disposed, and is partially absorbed by the load. Unabsorbed energy is reflected from the closed end 104, and propagates back across the load, resulting in additional absorption by the load. The residual energy which has not been absorbed during the trip across and back the load travels back up the waveguide toward the source. The length of the load section, plus the height/thickness of the step, in combination with the material properties of the material from which the load is constructed, determines the relative strength and phasing of the reflected and the residual energy. Thus, by selecting the proper length and step height/thickness, a standing wave can be set up in the absorber load, which will cause the reflected energy (from the step) and the residual energy (reflected from the closed end) to effectively cancel. This results in virtually no reflected energy propagating back toward the source. This matching approach is in stark contrast to conventional load designs, which rely on long tapers to produce very small impedance changes over length to minimize reflections. To obtain the slow impedance change with length, of course, necessitates larger load sizes than achieved by some embodiments of the present invention.

Because of the complexity of analyzing electromagnetic wave propagation with the boundary condition environment presented by the compact integrated waveguide load, the design can be optimized efficiently using simulation tools. For example, 3-D electromagnetic simulation tools such as CST Microwave Studio® or Ansoft High Frequency Structure Simulator (HFSS™) may be used to predict performance of a structure for which the absorber material properties are known. The prediction can include return loss over a desired (predefined) frequency range and similar parameters. If the desired values are not obtained, dimensions can be adjusted through parameterization and/or optimization of the simulation model.

In general, excellent performance (e.g., high return loss and high-power handling via efficient power dissipation) may be obtained with a compact waveguide load using a geometry where the load has an open center and is conformal with the interior surface of the waveguide. For example, the load section may have a thickness, measured in a direction perpendicular to the interior surface of the waveguide, of less than one eighth of the smallest cross-sectional dimension of the waveguide (e.g., a 0.020 inch load thickness compared to a 0.233 inch waveguide dimension). In the case of a rectangular waveguide, the smallest cross-sectional dimension is the 'b' dimension (E-plane) where 'a' and 'b' are the cross-sectional dimensions of the waveguide and 'a' (H-plane) is greater than 'b'. Similarly, the load may have a length, measured in the longitudinal dimension of the waveguide, shorter than the smallest cross-sectional dimension of the waveguide (e.g., 0.230 inch load length compared to 0.233 inch waveguide 'b' dimension).

In spite of the small size, the load can dissipate power efficiently because it is in intimate contact with the walls of the waveguide, even though electromagnetic absorbing material typically has a relatively high thermal resistance as compared to metals. In particular, the load is relatively thin in the direction perpendicular to the waveguide walls, and thus heat generated in the load does not have to travel far in order to reach the waveguide wall. Since the waveguide wall is typically a high thermal conductivity material, it can effectively cool the load.

An additional benefit of the tubiform geometry of the load is that it is resistant to vibration. In contrast, pyramidal type absorbers can have mechanical resonances that result in significant movement of the tip of the pyramid in vibration conditions, causing variations in the impedance and/or mechanical fatigue and failure of the absorber (e.g., the absorber tip may crack or break off completely).

If desired, the load may be constructed entirely from a homogenous material, although this is not essential. Alternately, if desired, the load may include one or more regions of material having differing properties. Use of non-homogenous construction may of course make optimization of the load dimensions more difficult and fabrication of the resulting load more complex. Accordingly, benefits in simplicity of construction may be obtained by using a homogenous absorber material with simple tubiform geometries, for example, as illustrated herein.

Figure 4:
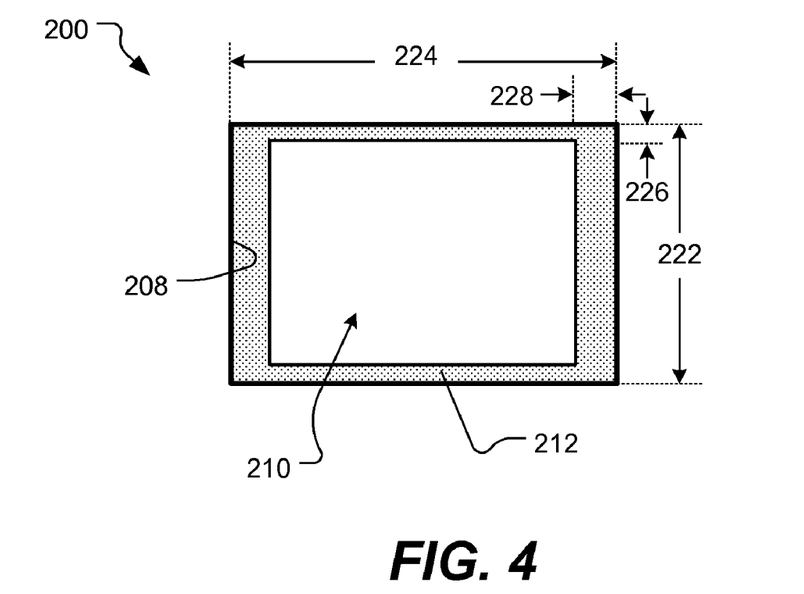
FIG. 4 is an end cross-sectional illustration of a compact waveguide load in accordance with some embodiments of the invention.
Figure 5:
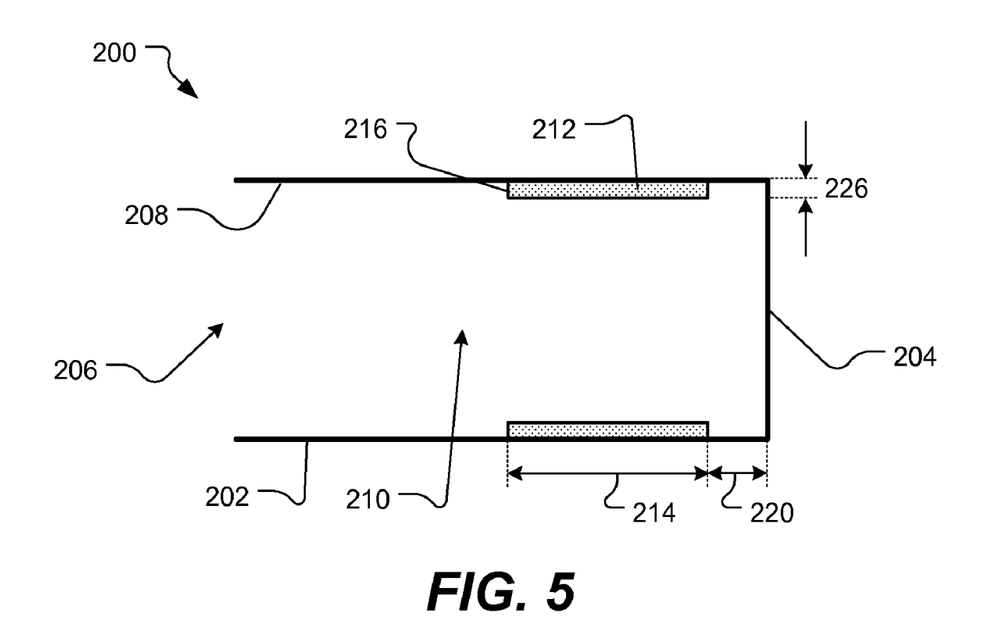
FIG. 5 is a side cross-sectional illustration of the compact waveguide load of FIG. 4.

FIGS. 4 and 5 illustrate an alternate arrangement of a compact waveguide integrated load in accordance with some embodiments of the present invention. The compact waveguide integrated load 200 is generally similar to that of FIGS. 1-3, except that the load section is not butted against the closed end 204 of the waveguide 202 but rather is displaced away from the closed end toward the open end 206 by a separation distance 220. The load section 212 has length 214 along the longitudinal dimension of the waveguide and protrudes outwardly from the interior surface 208 in the transverse direction (222, 224) into the interior region 210 of the waveguide, forming a step 216.

The load section 212 has differing thickness in the E-plane ('b' dimension) 222 and H-plane ('a' dimension) 224 of the waveguide. In the H-plane, the load has a first thickness 228, and in the E-plane, the load has a second thickness 226. Providing differing thickness can be beneficial in adjusting the impedance match of the load. In addition, differing thickness can be helpful in facilitating fabrication and/or insertion of the load in a waveguide cavity.

Various features illustrated in FIGS. 1-3 and FIGS. 4 and 5 can be combined. For example, in some embodiments the load section may be offset from the end of the waveguide and have a substantially uniform thickness on all walls. As another example, in some embodiments the load section may have differing thicknesses on the walls and be abutted against the end of the waveguide. In yet other embodiments, electromagnetic absorbing material may also be included on the closed end of the waveguide.

Figure 6:
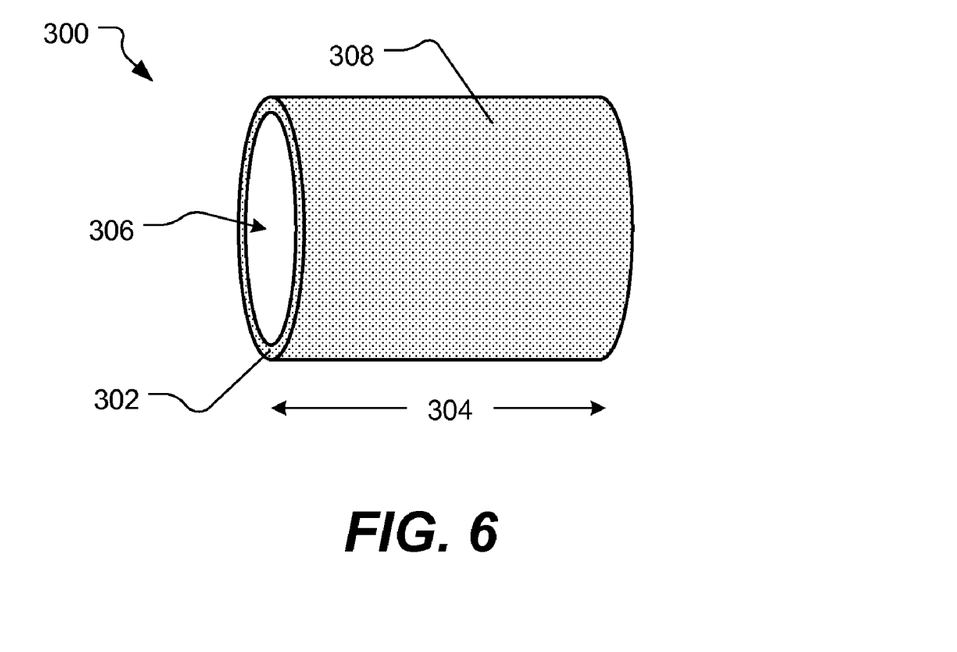
FIG. 6 is a perspective illustration of an alternate arrangement of a compact waveguide load in accordance with some embodiments of the invention.

Although the examples discussed up to this point have shown a rectangular waveguide, other waveguide geometries can also be used. For example, FIG. 6 provides a perspective view of a compact waveguide load suitable for installation into a circular waveguide. The waveguide load 300 is constructed from an electromagnetic-absorbing material 302, has a length 304 and an interior aperture 306. The exterior surface 308 of the load has a shape substantially congruent with the interior surface of the waveguide into which the load is to be installed. For example, the load may be fabricated to have an outer diameter substantially equal to the interior diameter of the waveguide. The outer diameter of the load may be greater or less than the interior diameter of the waveguide depending on the material properties of the electromagnetic-absorbing material and the waveguide. For example, a resilient electromagnetic-absorbing material may be fabricated to have a slightly larger outer diameter than the interior diameter of the waveguide so that the load provides a friction fit inside the waveguide to hold the load in place. As another example, the load may be fabricated from a rigid electromagnetic-absorbing material. In such a case, the load may have a slightly smaller outer diameter than the interior diameter of the waveguide to allow clearance for insertion of the load into the waveguide and fixing of the load to the waveguide with an adhesive.

Figure 7:
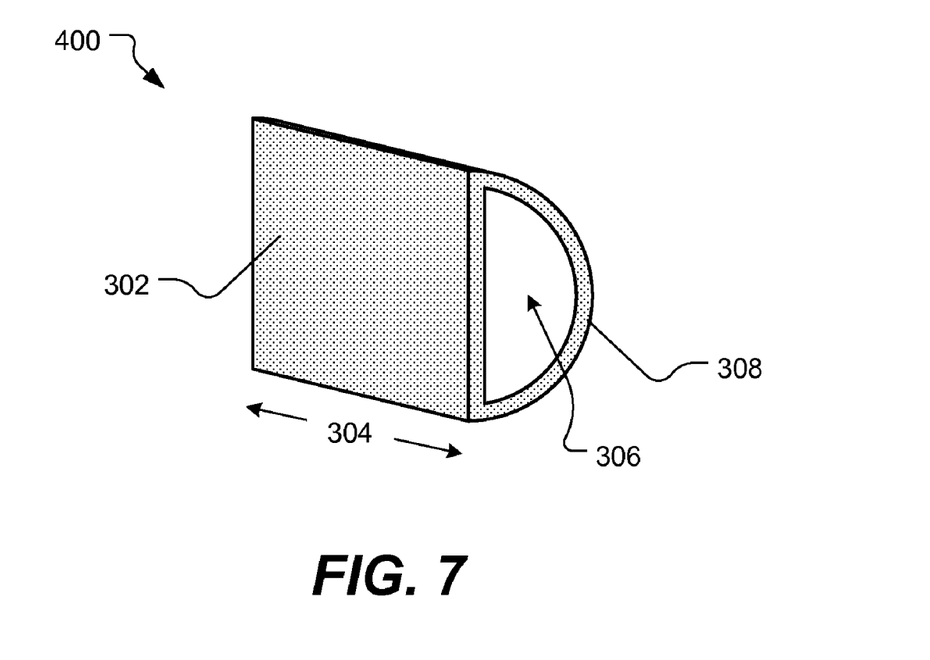
FIG. 7 is a perspective illustration of another alternate arrangement of a compact waveguide load in accordance with some embodiments of the invention.
Figure 8:
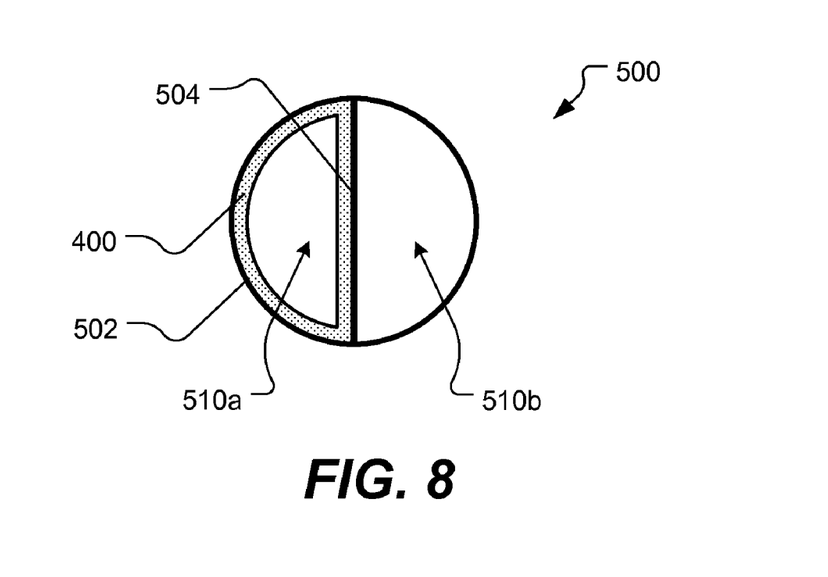
FIG. 8 is an end view of a circular waveguide having a septum polarizer and a compact waveguide load integrated into one side of the septum polarizer in accordance with some embodiments of the present invention.

Another example of a waveguide load is shown in FIG. 7. The compact waveguide load 400 has a D-shaped cross section. One exemplary example of an application for a D-shaped load is illustrated by a circular-horn septum-polarizer waveguide antenna shown in FIG. 8. The antenna 500 is formed from a waveguide 502, which has a septum 504 in the center to provide circular polarization. The septum divides the waveguide into two portions 510a, 510b. The D-shaped load 400, is installed into one of the two portions, and the other portion is attached to a feed port to allow transmission or reception of circularly polarized radiation. The load helps to absorb energy which spills over the septum that can reduce the axial ratio of the antenna. The load also helps to absorb energy which may be reflected from devices external to the antenna (e.g., a radome) that would otherwise be reradiated, reducing the axial ratio performance of the antenna.

Figure 10:
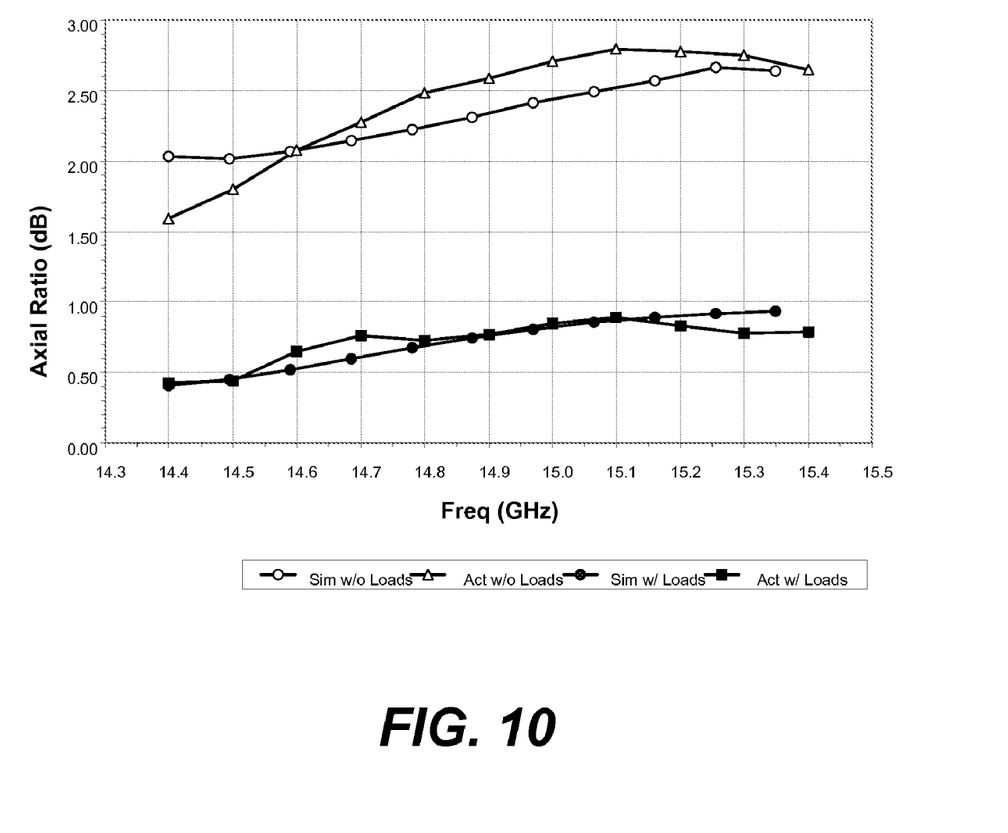
FIG. 10 is a graph showing performance of a compact antenna array with and without compact waveguide integrated loads in accordance with some embodiments of the present invention.

For example, commonly-owned co-pending U.S. patent application Ser. No. 12/045,574, filed on Mar. 10, 2008, entitled "Compact Waveguide Antenna Array and Feed" discloses various arrangements of waveguide antenna array systems, and is hereby incorporated by reference. Compact integrated waveguide loads can be integrated in antenna arrays in accordance with some embodiments of the present invention. As a specific example, a load shaped as shown in FIGS. 1-3 can be placed into the unfed portion of each of the 32 septum-polarizer waveguide-horn antenna elements of a 2×16 antenna array of the type shown in FIG. 5 of the above-referenced application. FIG. 10 provides a graph of the axial ratio performance of the 2×16 antenna array with and without the load absorbers (both simulated and actual measurements of a prototype antenna). It can be seen that the loads help to substantially reduce the axial ratio of the antenna.

Figure 9:
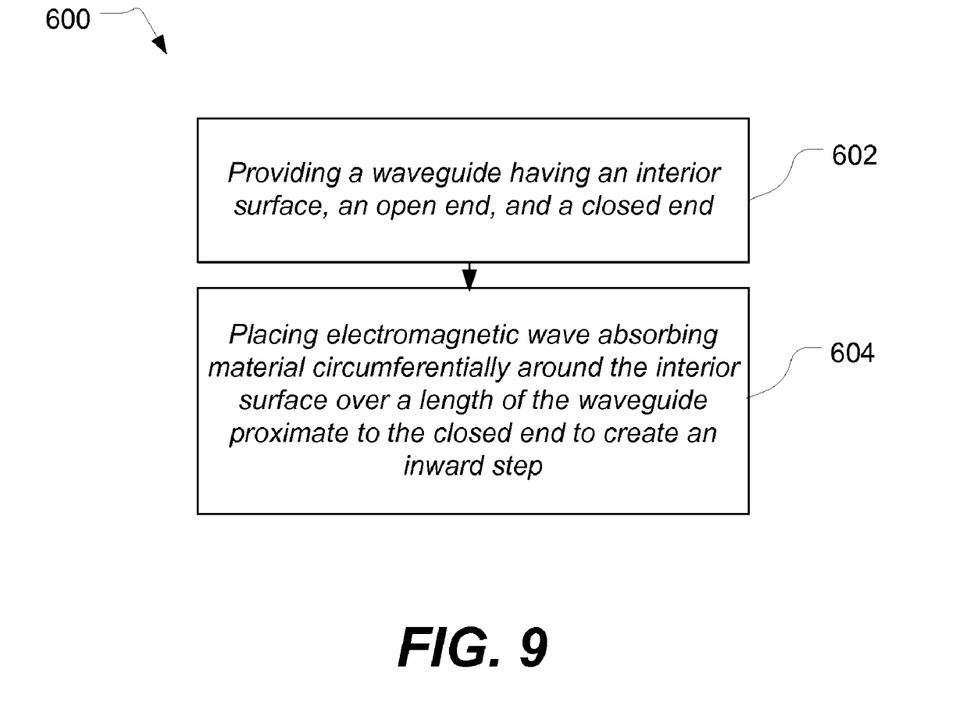
FIG. 9 is a flow chart of a method of making a compact waveguide integrated load in accordance with some embodiments of the present invention.

A method of making a compact waveguide integrated load will now be described in conjunction with the flow chart of FIG. 9. The method 600 can include providing 602 a waveguide having an interior surface, an open end, and a closed end. This waveguide can be a standalone device, part of a septum polarizer, part of a waveguide feed network, or part of a waveguide antenna. For example, the waveguide may be fabricated using construction techniques such as molding, machining, stereo lithography, piecemeal construction, and similar techniques. The method can also include placing 604 electromagnetic wave absorbing material into the waveguide. As described above, the waveguide material is placed circumferentially around the interior surface over a length of the waveguide proximate to the closed end. This creates an inward step within the waveguide.

Various ways of placing the electromagnetic wave absorbing material into the waveguide can be used. For example, in some embodiments, a plug of absorbing material can be cast within the waveguide, and then a center portion of the plug removed (e.g., by machining) to define the inward step. In other embodiments, a plug of absorbing material can be cast within the waveguide using a mold to define the center portion of the plug. For example, the mold may be a solid block sized so that the exterior of the block defines the desired interior edge of the step. Once the absorbing material has sufficiently cured, the mold block/tool can be removed.

In other embodiments, the electromagnetic wave absorbing material may be formed into a compact load having an exterior surface corresponding to the interior surface of the waveguide, and then the compact load can be inserted into the waveguide. The compact load may be secured to the waveguide, for example by a friction fit or an adhesive as described above. The compact load may be formed by various techniques, including for example, casting electromagnetic-absorbing material into a desired shape, machining a block of electromagnetic-absorbing material into the desired shape, and similar techniques and combinations thereof.

It will be appreciated that the simple geometry of the load enhances the manufacturability of the load. Because of the simple geometry (avoiding blind holes, tapers, steps, etc.), complex molding or machining techniques are not necessary to fabricate the load. Moreover, installation of the load into a waveguide is enhanced, since a load section can be fabricated separately from a waveguide section, and then the finished load section inserted into the finished waveguide to complete the assembly.

Summarizing and reiterating to some extent, a compact load has been developed which can be used in waveguide devices (e.g., septum polarizers, feed networks, antennas). The load is conformal to an interior surface of the waveguide, and relatively short in length and thickness. In spite of the small size, the load can be engineered to provide an excellent impedance match over a frequency range. The load can be entirely contained within the waveguide, making it compatible with very compact antenna arrays. For example, the load can be integrated into a septum polarizer to improve performance of the septum polarizer. Because the load conforms to the walls of the waveguide, thermal transfer to the waveguide is obtained, enabling improved radio frequency power handling as compared to conventional pyramid or wedge type absorbers. Because the load is small in terms of length and thickness, it is also extremely lightweight, helping in weight critical applications. Compact integrated waveguide loads can prove advantageous in small size antenna arrays and other applications where size, weight, and power handling are desired. More specifically, the depth of a small antenna array with septum-polarizer horn radiating elements can be drastically shortened/reduced by utilizing the compact load of this present invention as opposed to traditional long tapered absorber loads.

It is to be understood that the above-referenced arrangements are illustrative of the application for the principles of the present invention. It will be apparent to those of ordinary skill in the art that numerous modifications can be made without departing from the principles and concepts of the invention as set forth in the claims.

The invention claimed is:

1. A method of making a compact waveguide integrated load, comprising:

providing a waveguide having an interior surface, an open end, and a closed end; and placing electromagnetic wave absorbing material circumferentially around the interior surface over a length of the waveguide proximate to the closed end to create an inward step sized to provide an impedance match to the waveguide over a predefined frequency range.

2. The method of claim 1 wherein the placing electromagnetic wave absorbing material comprises:

casting a plug of electromagnetic wave absorbing material within the waveguide; and removing absorbing material from a center portion of the plug to define the inward step.

3. The method of claim 1 wherein the placing electromagnetic wave absorbing material comprises:

inserting a mold into the waveguide, the mold corresponding to an inner edge of the step; and depositing electromagnetic wave absorbing material between the waveguide and the mold.

4. The method of claim 1 wherein the placing electromagnetic wave absorbing material comprises:

forming a tubiform body having a length and a bore, the body comprising electromagnetic wave absorbing material and shaped to be congruent to the interior surface of the waveguide; and inserting the tubiform body into the waveguide.

* * * * *